United States Patent
Someya

(10) Patent No.: US 11,159,709 B2
(45) Date of Patent: Oct. 26, 2021

(54) CAMERA, CAMERA PROCESSING METHOD, SERVER, SERVER PROCESSING METHOD, AND INFORMATION PROCESSING APPARATUS

(71) Applicant: SONY CORPORATION, Tokyo (JP)

(72) Inventor: Takahisa Someya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/472,035

(22) PCT Filed: Dec. 19, 2017

(86) PCT No.: PCT/JP2017/045462
§ 371 (c)(1),
(2) Date: Jun. 20, 2019

(87) PCT Pub. No.: WO2018/123714
PCT Pub. Date: Jul. 5, 2018

(65) Prior Publication Data
US 2020/0099848 A1    Mar. 26, 2020

(30) Foreign Application Priority Data
Dec. 27, 2016  (JP) .............................. JP2016-252381

(51) Int. Cl.
*H04N 5/232* (2006.01)
*H04N 7/18* (2006.01)

(52) U.S. Cl.
CPC ......... *H04N 5/23206* (2013.01); *H04N 7/181* (2013.01)

(58) Field of Classification Search
CPC ............... H04N 5/23206; H04N 7/181; H04N 1/00127; H04N 5/77; H04N 5/222; G03B 17/02
See application file for complete search history.

(56) References Cited

U.S. PATENT DOCUMENTS 8,164,426 B1 * 4/2012 Steinhart ............ H04N 5/23219
340/10.4
8,180,208 B2 * 5/2012 Gallagher .............. G03B 17/00
396/52
(Continued)

FOREIGN PATENT DOCUMENTS

CN    2005-204124 A    7/2005
CN    101132576 A    2/2008
(Continued)

OTHER PUBLICATIONS

International Search Report dated Feb. 27, 2018 in PCT/JP2017/045462 filed on Dec. 19, 2017.

*Primary Examiner* — Timothy J Henn
(74) *Attorney, Agent, or Firm* — Oblon, McClelland, Maier & Neustadt, L.L.P.

(57) ABSTRACT

To enable information such as clip meta information to be automatically set to a camera.

The camera transmits position information to a server via a network. The camera receives information related to a specific person who possesses a portable terminal located near a position indicated by the position information from the server via the network. For example, the specific person is a reporter who reports using the camera, and the information related to the specific person is coverage information regarding the reporter. Furthermore, for example, the specific person is a camera operator who operates the camera, and the information related to the specific person is camera setting information regarding the camera operator.

18 Claims, 12 Drawing Sheets

(56) References Cited

U.S. PATENT DOCUMENTS

| | | | |
|---|---|---|---|
| 2002/0080256 A1* | 6/2002 | Bates | H04N 5/232 348/335 |
| 2004/0073687 A1 | 4/2004 | Murata | |
| 2006/0170778 A1* | 8/2006 | Ely | H04N 21/4223 348/207.99 |
| 2008/0147730 A1 | 6/2008 | Lee et al. | |
| 2009/0254562 A1* | 10/2009 | Casaccia | G11B 27/11 |
| 2010/0191459 A1 | 7/2010 | Carter et al. | |
| 2013/0027571 A1* | 1/2013 | Parulski | H04N 5/23219 348/207.11 |
| 2013/0156274 A1* | 6/2013 | Buchmueller | G06Q 10/101 382/118 |
| 2013/0283329 A1* | 10/2013 | Huang | G06K 9/00979 725/114 |
| 2014/0156462 A1* | 6/2014 | Tsuchida | G06Q 30/0623 705/26.61 |
| 2017/0078454 A1* | 3/2017 | Berookhim | H04L 67/06 |
| 2017/0255820 A1* | 9/2017 | Liu | G06K 9/00677 |
| 2017/0364749 A1* | 12/2017 | Bhogal | G06K 9/00288 |

FOREIGN PATENT DOCUMENTS

| | | |
|---|---|---|
| CN | 102339579 A | 2/2012 |
| CN | 103347046 A | 10/2013 |
| CN | 103731599 A | 4/2014 |
| EP | 1289289 A1 | 3/2003 |
| JP | 10-285501 A | 10/1998 |
| JP | 2002-352218 A | 12/2002 |
| JP | 2004-96413 A | 3/2004 |
| JP | 2010-288002 A | 12/2010 |
| JP | 2016-154300 A | 8/2016 |

\* cited by examiner

FIG.2

| DATE | REPORTER ID | REPORTER | COVERAGE ID | COVERAGE TITLE | COVERAGE LOCATION |
|---|---|---|---|---|---|
| 2016/11/08 | ddd000001 | eee000001 | bbb000001 | ccc000001 | fff000001 |
| 2016/11/08 | ddd000002 | eee000002 | bbb000002 | ccc000002 | fff000002 |
| 2016/11/08 | ddd000003 | eee000003 | bbb000003 | ccc000003 | fff000003 |
| 2016/11/08 | ddd000004 | eee000004 | bbb000004 | ccc000004 | fff000004 |
| 2016/11/08 | ddd000005 | eee000005 | bbb000005 | ccc000005 | fff000005 |

FIG. 3

| CAMERA OPERATOR ID | SETTING INFORMATION |
|---|---|
| ggg000001 | hhh000001 |
| ggg000002 | hhh000002 |
| ggg000003 | hhh000003 |
| ggg000004 | hhh000004 |
| ggg000005 | hhh000005 |

CAMERA, CAMERA PROCESSING METHOD, SERVER, SERVER PROCESSING METHOD, AND INFORMATION PROCESSING APPARATUS

TECHNICAL FIELD

The present technology relates to a camera, a camera processing method, a server, a server processing method, and an information processing apparatus.

BACKGROUND ART

In covering broadcast content production, coverage content is planned in advance, and clip meta information (coverage information) is also produced in advance. There is a function to register the clip meta information in a camcorder to be used. However, which camcorder is to be used is not often decided at the time of planning and what is decided is only a reporter (including a reporting crew), and device information is not often included in the produced clip meta information. Therefore, the clip meta information has not been able to be automatically set to the camcorder. For example, Patent Document 1 states that imaging position information obtained from GPS information is superimposed and recorded on video information being recorded together with photographer data registered in advance.

CITATION LIST

Patent Document

Patent Document 1: Japanese Patent Application Laid-Open No. 10-285501

SUMMARY OF THE INVENTION

Problems to be Solved by the Invention

An object of the present technology is to enable information such as clip meta information to be automatically set to a camera.

Solutions to Problems

A concept of the present technology resides in
a camera including:
an information transmission unit configured to transmit position information to a server via a network; and
an information reception unit configured to receive information related to a specific person who possesses a portable terminal located near a position indicated by the position information from the server via the network.

In the present technology, the information transmission unit transmits the position information to the server via the network. For example, the information transmission unit may transmit the position information to the server when power is turned on. Then, the information reception unit receives the information related to the specific person who possesses the portable terminal located near the position indicated by the position information from the server via the network.

As described above, in the present technology, the position information is transmitted to the server, so that the information related to the specific person who possesses the portable terminal located near the position indicated by the position information can be received from the server. Therefore, the information related to the specific person can be automatically set to the camera.

Note that, in the present technology, for example, the specific person may be a reporter who reports using the camera, the information related to the specific person may be coverage information regarding the reporter, and the camera may further include an information holding unit configured to hold the received information as meta information for being added to imaging clip data. In this case, the camera can automatically set the coverage information regarding the reporter and can add the coverage information to the imaging clip data.

Furthermore, in the present technology, for example, the specific person may be a camera operator who operates the camera, the information related to the specific person may be camera setting information regarding the camera operator, and the camera may further includes a camera control unit configured to perform camera setting on the basis of the received information. In this case, the camera can be automatically set to setting suitable for the camera operator.

Furthermore, another concept of the present technology resides in
a server including:
a communication unit configured to perform communication via a network with portable terminals possessed by a plurality of specific persons and a specific camera or a plurality of specific cameras;
an information holding unit configured to hold information related to each of the plurality of specific persons; and
a state determination unit configured to determine, when there is position information from one camera among the specific camera or the plurality of specific cameras, whether or not there is a matching state in which one of the portable terminals possessed by the plurality of specific persons exists near the one camera, on the basis of the position information and position information from the portable terminals possessed by the plurality of specific persons, in which
the communication unit transmits information related to a possessor of the one portable terminal located near the one camera to the one camera when it is determined that there is the matching state.

In the present technology, the communication unit performs the communication via the network with the portable terminals possessed by the plurality of specific persons and the specific camera or the plurality of specific cameras. The information holding unit holds the information associated with each of a plurality of specific persons.

When there is the position information from one camera among the specific camera or the plurality of specific cameras, the state determination unit determines whether or not there is the matching state in which one of the portable terminals possessed by the plurality of specific persons exists near the one camera on the basis of the position information and the position information from the portable terminals possessed by the plurality of specific persons. Then, the communication unit transmits the information related to the possessor of the one portable terminal located near the one camera to the one camera when it is determined that there is the matching state.

As described above, in the present technology, when there is the matching state in which one of the portable terminals possessed by the plurality of specific persons exists near one camera, the information related to the possessor of the one portable terminal located near the one camera is transmitted to the one camera. Therefore, the information related to the specific person can be automatically set to the camera.

Note that, in the present technology, for example, each of the plurality of specific persons may be a reporter who reports using any one of the specific camera or the plurality of specific cameras, and the information related to each of the plurality of specific persons may be coverage information regarding the reporter. As a result, the coverage information regarding the reporter can be automatically set to the camera and the coverage information can be added to the imaging clip data.

In this case, for example, a display signal generation unit configured to generate a display signal of a UI screen that indicates which of the plurality of cameras is in the matching state may be further included. Then, in this case, the camera in the matching state may be displayed on the UI screen in association with coverage information reported with the camera.

Furthermore, in the present technology, for example, each of the plurality of specific persons may be a camera operator who operates any one of the specific camera or the plurality of specific cameras, and the information related to each of the plurality of specific persons may be camera setting information regarding the camera operator. As a result, the camera can be automatically set to setting suitable for the camera operator.

Furthermore, another concept of the present technology resides in a camera including:

an information transmission unit configured to transmit position information to a server via a network; and an information reception unit configured to receive coverage information corresponding to the position information from the server via the network.

In the present technology, the information transmission unit transmits the position information to the server via the network. For example, the information transmission unit may transmit the position information to the server when power is turned on. Then, the information reception unit receives the coverage information corresponding to the position information from the server via the network. For example, an information holding unit configured to hold the received coverage information as meta information for being added to imaging clip data may be further included.

As described above, in the present technology, the position information is transmitted to the server, so that the coverage information corresponding to the position information can be received from the server. Therefore, the coverage information can be automatically set.

Furthermore, another concept of the present technology resides in a server including:

a communication unit configured to perform communication via a network with a specific camera or a plurality of specific cameras; and an information holding unit configured to hold coverage information in association with position information, in which, when there is position information from one camera among the specific camera or the plurality of specific cameras, the communication unit transmits coverage information corresponding to the position information to the one camera.

In the present technology, the communication unit performs the communication via the network with the specific camera or the plurality of specific cameras. The information holding unit holds the coverage information in association with the position information. Then, when there is the position information from one camera among the specific camera or the plurality of specified cameras, the communication unit transmits the coverage information corresponding to the position information to the one camera.

As described above, in the present technology, when there is the position information from one camera among the specific camera or the plurality of specified cameras, the coverage information corresponding to the position information is transmitted to the one camera. Therefore, the coverage information with the camera can be automatically set to the camera.

Effects of the Invention

According to the present technology, information such as clip meta information can be automatically set to a camera. Note that the effects described in the present specification are merely examples and are not limited, and additional effects may be exhibited.

BRIEF DESCRIPTION OF DRAWINGS

FIG. 2 is a diagram schematically illustrating an example of coverage information (clip meta information) for each reporter.

FIG. 3 is a diagram schematically illustrating an example of camera setting information for each camera operator.

MODE FOR CARRYING OUT THE INVENTION

Hereinafter, modes for implementing the present invention (hereinafter referred to as "embodiments") will be described. Note that the description will be given in the following order.

1. First Embodiment
2. Second Embodiment
3. Application
4. Modification

1. First Embodiment

Configuration Example of Camera System

Figure 1:
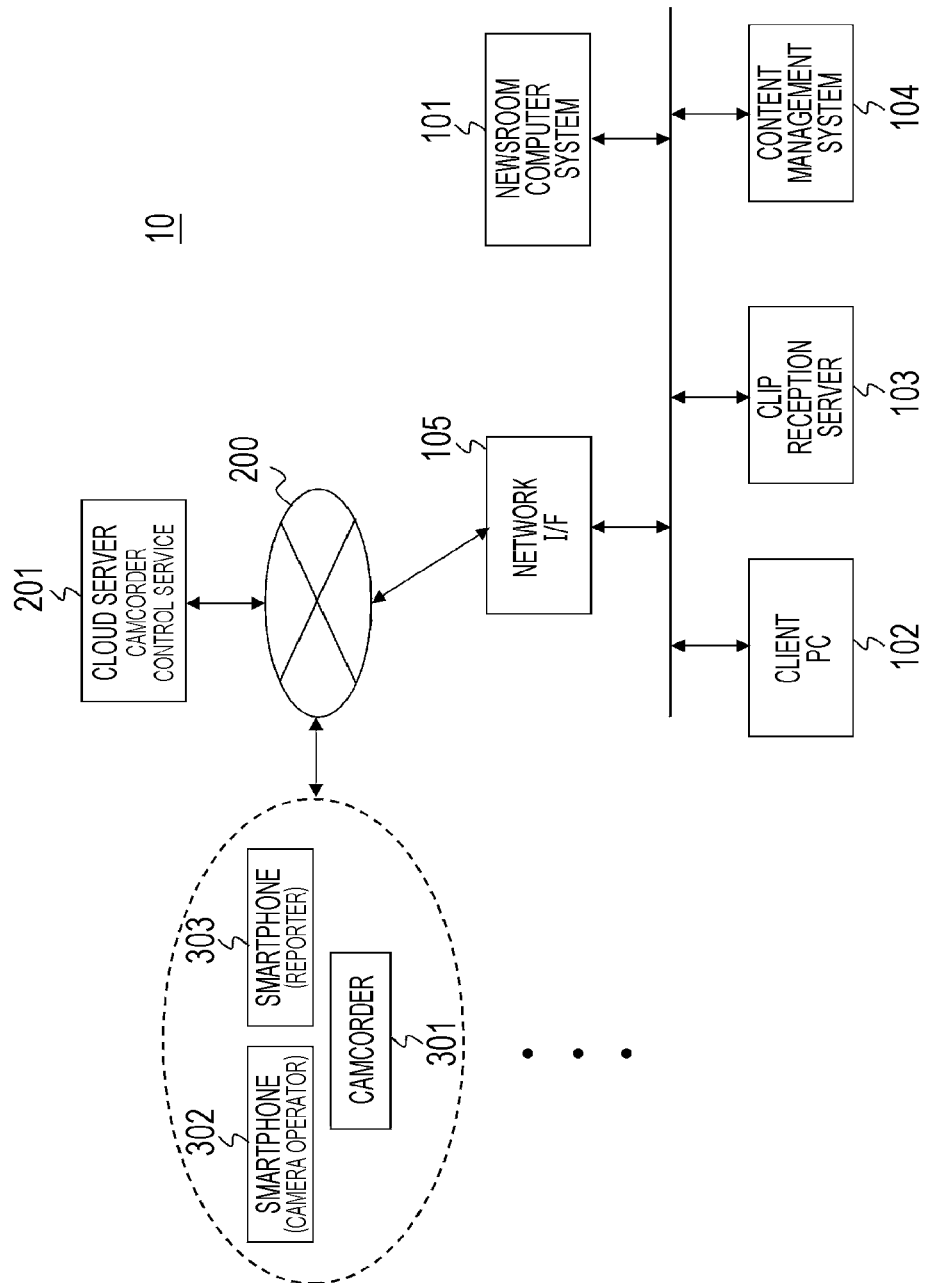
FIG. 1 is a block diagram illustrating a configuration example of a camera system as an embodiment.

FIG. 1 illustrates a configuration example of a camera system 10 as an embodiment. The camera system 10 includes, on a television station side, a newsroom computer system 101, a client PC 102, a clip reception server 103, a content management system 104, and a network interface 105 as a communication unit.

Furthermore, the camera system 10 includes a network 200 such as the Internet, a cloud server 201, a camcorder 301 as a camera, and smartphones 302 and 303 as portable terminals. Note that, in the illustrated example, only one camcorder 301 is illustrated. However, there are one or a plurality of, in this embodiment, five camcorders 301 that can be used for coverage by a television station. Note that although the portable terminal is not limited to a smartphone, the portable terminal needs to have a conventionally known function to acquire position information. Although description of detailed configurations of the smartphones 302 and 303 is omitted, the position information acquired by the smartphones 302 and 303 in a power on state is sent to the cloud server 201 via the network 200 in the present embodiment.

Furthermore, in the illustrated example, the smartphones 302 and 303 are each illustrated only one by one. However, there are the smartphones 302 as many as the number of camera operators who can operate the above-described camcorder 301, and there are the smartphones 303 as many as the number of reporters (journalists) who reports using the camcorder 301.

In this embodiment, it is assumed that the number of camera operators and the number of reporters are both five. Here, one of the reporters means not only simply one person but also one of reporting crews each crew including a plurality of members. For example, as illustrated with the broken line frame, news gathering is performed by the camcorder 301, the camera operator, and the reporter as a set.

The newsroom computer system 101 plans coverage content, creates coverage information (clip meta information) for each reporter, and uploads the coverage information to the cloud server 201 through the network interface 105 and the network net 200.

FIG. 2 schematically illustrates an example of coverage information (clip meta information) for each reporter. The coverage information includes information of "date", "reporter ID", "reporter", "coverage ID", "coverage title", and "coverage location". Note that the information included in the coverage information is not limited to the aforementioned example, and may include only a part of the information or may further include another information.

Referring back to FIG. 1, the client PC 102 receives a UI screen display signal from the cloud server 201 via the network 200 and the network interface 105, and displays a UI screen. Although details will be described below, the television station side can confirm a camcorder of the five camcorders 301 that is in an online state (power on state), and further, a camera that is used and coverage for which the camera is used, and the like, from the UI screen.

Furthermore, the client PC 102 creates camera setting information for each camera operator, and uploads the camera setting information to the cloud server 201 through the network interface 105 and the network net 200. Note that the creation and upload of the camera setting information for each camera operator may be performed by another spot instead of by the client PC 102. For example, it is also conceivable that each camera operator actually performs camera setting with the camcorder 301 and directly uploads the camera setting information from the camcorder 301 to the cloud server 201 via the network 200.

FIG. 3 schematically illustrates an example of the camera setting information for each camera operator. The camera setting information includes information of "camera operator ID" and "setting information". For example, the "setting information" includes information such as assignable button setting, view finder setting, and file format setting.

Referring back to FIG. 1, the clip reception server 103 receives imaging clip data (AV data file) obtained by imaging with the camcorder 301 via the network 200 and the network interface 105. The content management system 104 manages the imaging clip data received by the clip reception server 103.

Figure 4:
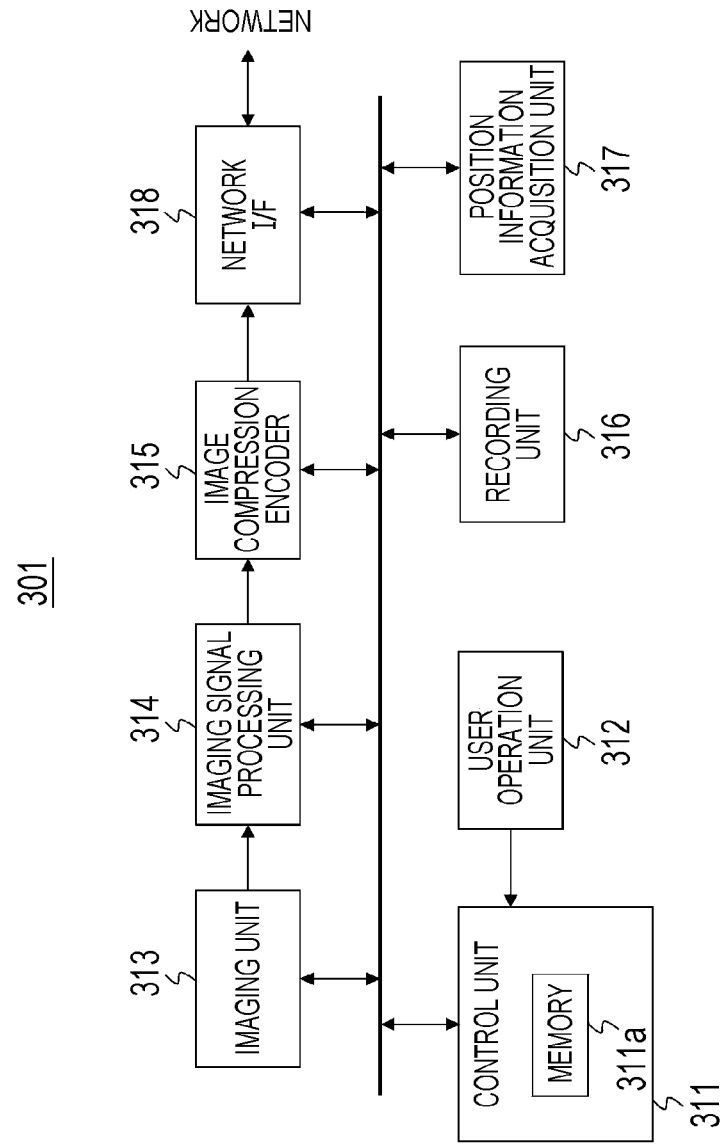
FIG. 4 is a block diagram illustrating a configuration example of a camcorder.

FIG. 4 illustrates a configuration example of the camcorder 301. The camcorder 301 includes a control unit 311, a user operation unit 312, an imaging unit 313, an imaging signal processing unit 314, an image compression encoder 315, a recording unit 316, a position information acquisition unit 317, and a network interface 318.

The control unit 311 controls operation of each part of the camcorder 301. The control unit 311 includes a memory 311*a* in addition to a CPU. The user operation unit 312 is connected to the control unit 311, and configures a user interface that receives various operations by a user.

The imaging unit 313 includes an imaging lens and an imaging element (not illustrated), captures an image, and outputs an imaging signal. The imaging element is an imaging element such as a charge coupled device (CCD) or a complementary metal-oxide semiconductor (CMOS). The imaging signal processing unit 314 performs sample hold and gain control, conversion from an analog signal to a digital signal, white balance adjustment, gamma correction, and the like, for the imaging signal (analog signal) output from the imaging unit 313 to generate captured image data.

The image compression encoder 315 performs data compression processing for the captured image data generated by the imaging signal processing unit 314 by, for example, an MPEG method, to generate imaging clip data. The recording unit 316 temporarily records the imaging clip data obtained by the image compression encoder 315. The position information acquisition unit 317 receives a radio wave from a global positioning system (GPS) satellite and acquires information of a position (longitude, latitude, and altitude) of the camcorder 301.

The network interface 318 configures a communication unit, and communicates with the cloud server 201 via the network 200. In this embodiment, the network interface 318 sends the position information acquired by the position information acquisition unit 317 to the cloud server 201 when the power is turned on. The position information acquired by the smartphones 302 and 303 is also sent from the smartphones 302 and 303 in the power on state to the cloud server 201 via the network 200. As a result, as described below, the cloud server 201 determines whether or not there is the smartphone 302 or 303 in a matching state with the camcorder 301 that has sent the position information.

Furthermore, the network interface 318 sends the captured image data obtained by the image compression encoder 315 to the cloud server 201 as streaming data. As a result, in the cloud server 201, for example, as described later, data of a thumbnail image to be placed on the UI screen is generated from the captured image data.

Furthermore, the network interface 318 receives, from the cloud server 201, the coverage information regarding the reporter located near its own camcorder 301 and possessing the smartphone 303 in the matching state with its own camcorder 301 (the reporter is regarded as a reporter who reports using its own camcorder 301). This coverage information is stored in the memory 311a as meta information to be added to the imaging clip data.

Furthermore, the network interface 318 receives, from the cloud server 201, the camera setting information regarding the camera operator located near its own camcorder 301 and possessing the smartphone 302 in the matching state with its own camcorder 301 (the camera operator is regarded as a camera operator who operates its own camcorder 301). The control unit 311 performs camera setting on the basis of the received camera setting information.

Furthermore, the network interface 318 communicates with the network interface 105 via the network 200. As a result, the imaging clip data recorded in the recording unit 316 is sent to and stored in the clip reception server 103 via the network 200 and the network interface 105. In this case, the coverage information stored in the memory 311a is added to the imaging clip data as meta information.

Figure 5:
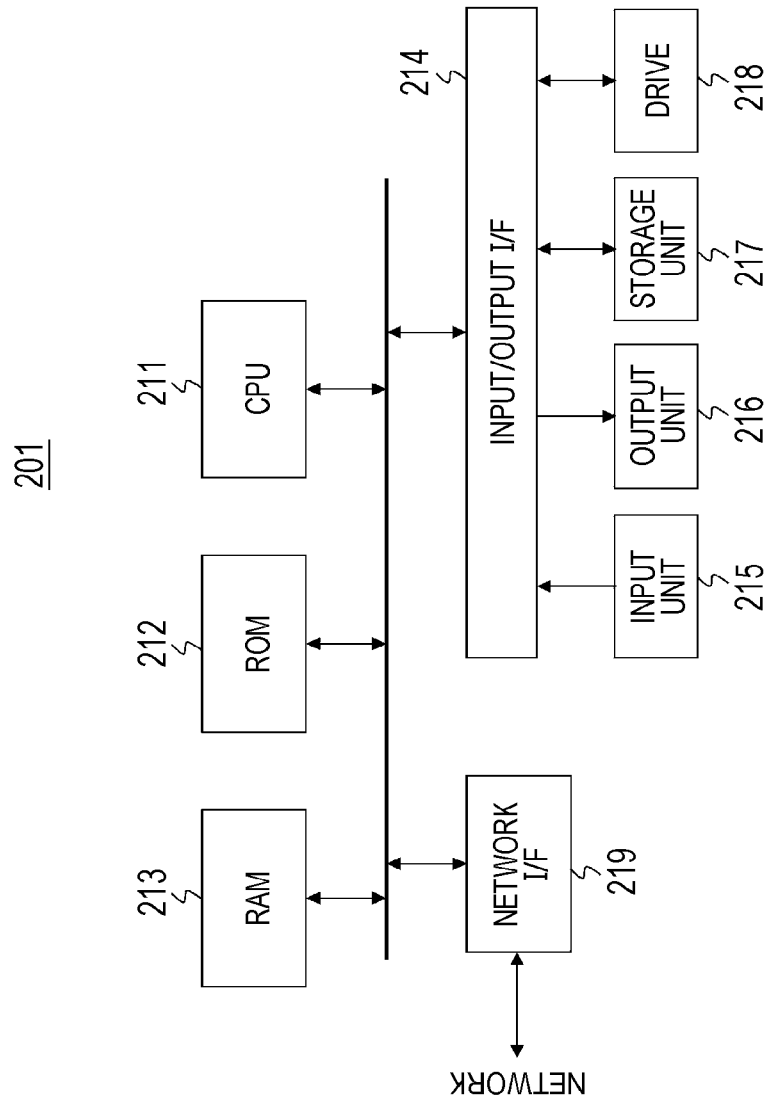
FIG. 5 is a block diagram illustrating a configuration example of a cloud server.

FIG. 5 illustrates a configuration example of the cloud server 201. The cloud server 201 includes a CPU 211, a ROM 212, a RAM 213, an input/output interface 214, an input unit 215, an output unit 216, a storage unit 217, a drive 218, and a network interface 219.

In the cloud server 201, the CPU 211, the ROM 212, and the RAM 213 are mutually connected by a bus. Moreover, the input/output interface 214 is connected to the bus. The input unit 215, the output unit 216, the storage unit 217, and the drive 218 are connected to the input/output interface 214. The CPU 211 controls operation of each part of the cloud server 201.

The input unit 215 is configured by a keyboard, a mouse, a microphone, and the like. The output unit 216 is configured by a display, a speaker, and the like. The storage unit 217 is configured by a hard disk drive (HDD), a non-volatile memory, and the like. The drive 218 drives a removable medium such as a magnetic disk, an optical disk, a magneto-optical disk, or a memory card.

Furthermore, the network interface 219 is connected to the bus. The network interface 219 communicates with the camcorder 301 and the smartphones 302 and 303 via the network 200. In this embodiment, the network interface 219 receives, from the smartphones 302 and 303, the position information indicating the positions of the smartphones 302 and 303. This position information is information of the position (longitude, latitude, and altitude) obtained by the smartphones 302 and 303 by receiving the radio wave from the GPS satellite.

Furthermore, the network interface 219 receives the position information from the camcorder 301. When receiving the position information from a certain camcorder 301, the CPU 211 determines that the camcorder 301 is in the matching state with one smartphone 303 when the one smartphone 303 exists near the camcorder 301, for example, within N meters from the camcorder 301, on the basis of the received position information and the position information received from the smartphone 303. Here, N may be made settable to any value by the user.

In this case, the reporter who possesses the one smartphone 303 is regarded as a person who reports using the camcorder 301. Then, the network interface 219 sends, to the camcorder 301, the coverage information related to the possessor (the reporter) of the smartphone 303 in the matching state under the control of the CPU 211. As a result, the camcorder 301 holds the coverage information as meta information for being added to the imaging clip data.

Furthermore, when receiving the position information from a certain camcorder 301, the CPU 211 determines that the camcorder 301 is in the matching state with one smartphone 302 when the one smartphone 302 exists near the camcorder 301, for example, within N meters from the camcorder 301, on the basis of the received position information and the position information received from the smartphone 302. Here, N may be made settable to any value by the user.

In this case, the camera operator possessing the one smartphone 302 is regarded as a person who operates the camcorder 301. Then, the network interface 219 sends, to the camcorder 301, the camera setting information related to the possessor (the camera operator) of the smartphone 302 in the matching state under the control of the CPU 211. As a result, camera setting is performed on the basis of the camera setting information in the camcorder 301.

Furthermore, the network interface 219 receives the captured image data as streaming data from the camcorder 301 in the online state. The CPU 211 generates a display signal of the UI screen that enables confirming a camcorder of the five camcorders 301 that is in an online state (power on state), and further, a camcorder 301 that is used and coverage for which the camcorder 301 is used, and the like. At this time, the CPU 211 generates data of thumbnail images to be placed on the UI screen on the basis of the captured image data sent from the camcorder 301 in the online state.

The network interface 219 communicates with the network interface 105 via the network 200. In this embodiment, the network interface 219 receives, from the newsroom computer system 101, the coverage information (clip meta information) for each reporter (see FIG. 2). The coverage information for each reporter is stored in the RAM 213 or the storage unit 217.

Furthermore, the network interface 219 receives the camera setting information for each camera operator from the client PC 102 (see FIG. 3). The camera setting information for each camera operator is stored in the RAM 213 or the storage unit 217. Furthermore, the network interface 219 transmits the display signal of the UI screen to the client PC 102. As a result, the client PC 102 becomes able to display the UI screen.

Figure 6:
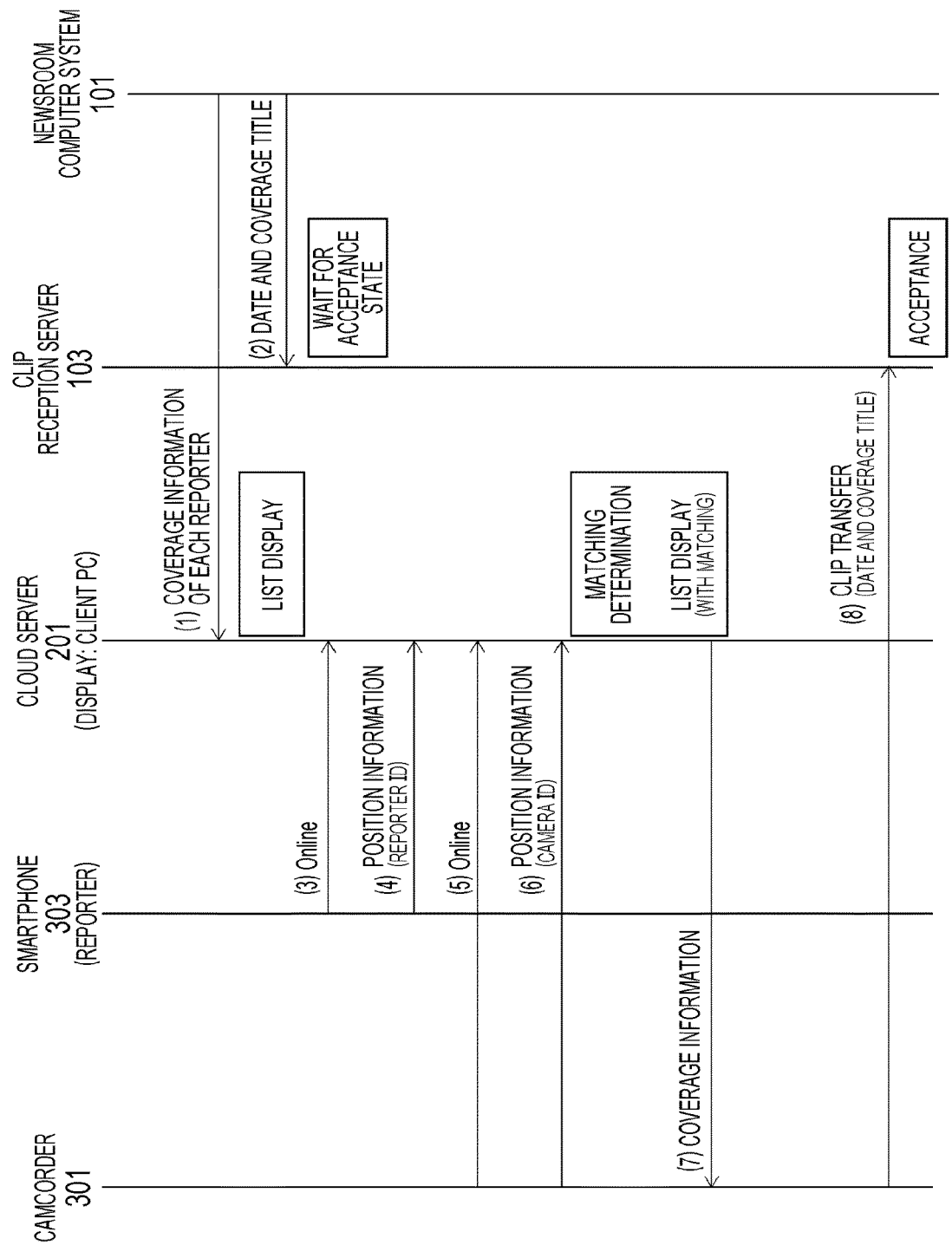
FIG. 6 is a sequence diagram illustrating an operation example in a case of automatically transmitting, from a cloud server to a camcorder, coverage information regarding a reporter who reports using the camcorder.

An operation example in a case of automatically transmitting, from the cloud server 201 to the camcorder 301, the coverage information regarding the reporter who reports using the camcorder 301 will be described using the sequence diagram in FIG. 6.

Figure 7:
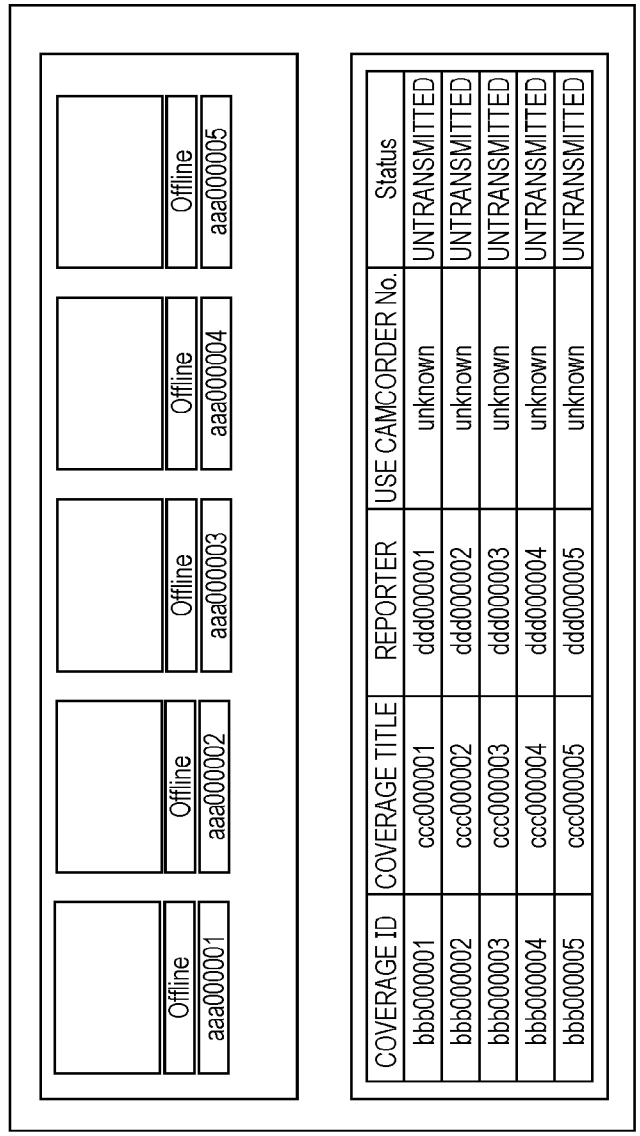
FIG. 7 is a diagram illustrating an example of a UI screen (all camcorders are in an offline state).

(1) The coverage information for each reporter is transmitted from the newsroom computer system 101 to the cloud server 201 and stored in the cloud server 201. In this case, the cloud server 201 generates the display signal of the UI screen having the coverage information for each reporter on the basis of the coverage information for each reporter. Although not illustrated in the sequence diagram, the display signal is sent to the client PC 102 and display on the UI screen is performed. FIG. 7 illustrates an UI display example in the aforementioned case, and the coverage information for each reporter is displayed as a list on the lower side.

Here, information of "coverage ID", "coverage title", and "reporter" is the same as the information of "coverage ID", "coverage title", and "reporter" in the coverage information (see FIG. 2) for each reporter sent from the newsroom computer system 101 to the cloud server 201. Information of "use camcorder No." is information of a serial number (camcorder No.) of the camcorder 301 used for each coverage but it is "unknown" because the information is unknown at this point of time.

Furthermore, information of "Status" is information indicating whether or not transmission of the coverage information has been made to the camcorder 301 but it is "untransmitted" because the coverage information has not been transmitted yet at this point of time.

Furthermore, there is a portion for displaying whether or not each camcorder 301 is online as a thumbnail image on the upper side on the UI screen. At this point of time, since all the camcorders 301 are in the offline state, "Offline" is displayed together with "camcorder No.", and there is no display of thumbnail images.

(2) The information of the date and the coverage title corresponding to the coverage information for each reporter is sent from the newsroom computer system 101 to the clip reception server 103. As a result, the clip reception server 103 becomes in a wait for acceptance state.

(3) The smartphone 303 becomes in the online state and is connected to the cloud server 201 via the network 200.

(4) The position information is sent from the smartphone 303 to the cloud server 201. In this case, the information of the "reporter ID" for identifying the possessor of the smartphone 303 is added to the position information.

Figure 8:
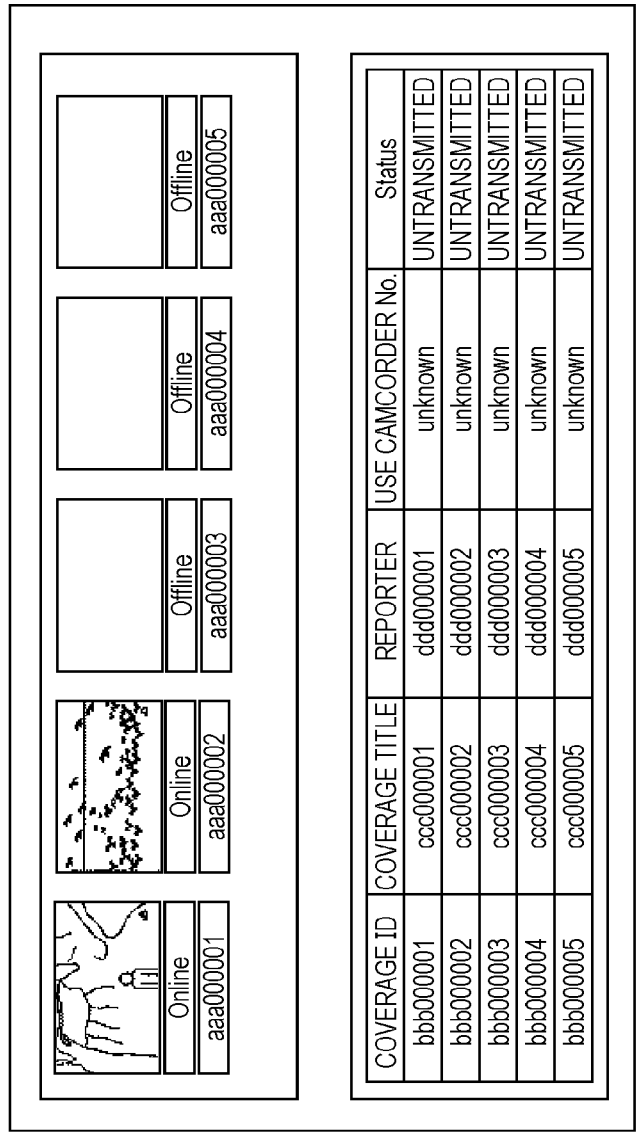
FIG. 8 is a diagram illustrating an example of a UI screen (some of camcorders are in an online state).

(5) The camcorder 301 becomes in the online state and is connected to the cloud server 201 via the network 200, and the captured image data is sent as streaming data from the camcorder 301 to the cloud server 201. FIG. 8 illustrates a UI display example in the aforementioned case and displays the thumbnails corresponding to the camcorder 301 with the "camcorder No." of "aaa000001" and the camcorder 301 with the "camcorder No." of "aaa000002", and illustrates that these camcorders 301 are in the online state.

(6) The position information is sent from the camcorders 301 to the cloud server 201. In this case, a serial number (camcorder No.) of the camcorder 301 is added to the position information as a "camera ID" for identifying the camcorder 301. In the cloud server 201, matching determination is performed for each camcorder 301 from which the position information is sent.

In other words, the camcorder 301 is determined to be in the matching state with one smartphone 303 when the one smartphone 303 exists near the camcorder 301, for example, within N meters from the camcorder 301, on the basis of the sent position information and the position information received from the smartphone 303.

(7) When the camcorder 301 is determined to be in the matching state, the coverage information related to the reporter who possesses the one smartphone 303 is sent from the cloud server 201 to the camcorder 301. As a result, the camcorder 301 holds the coverage information as meta information for being added to the imaging clip data.

Figure 9:
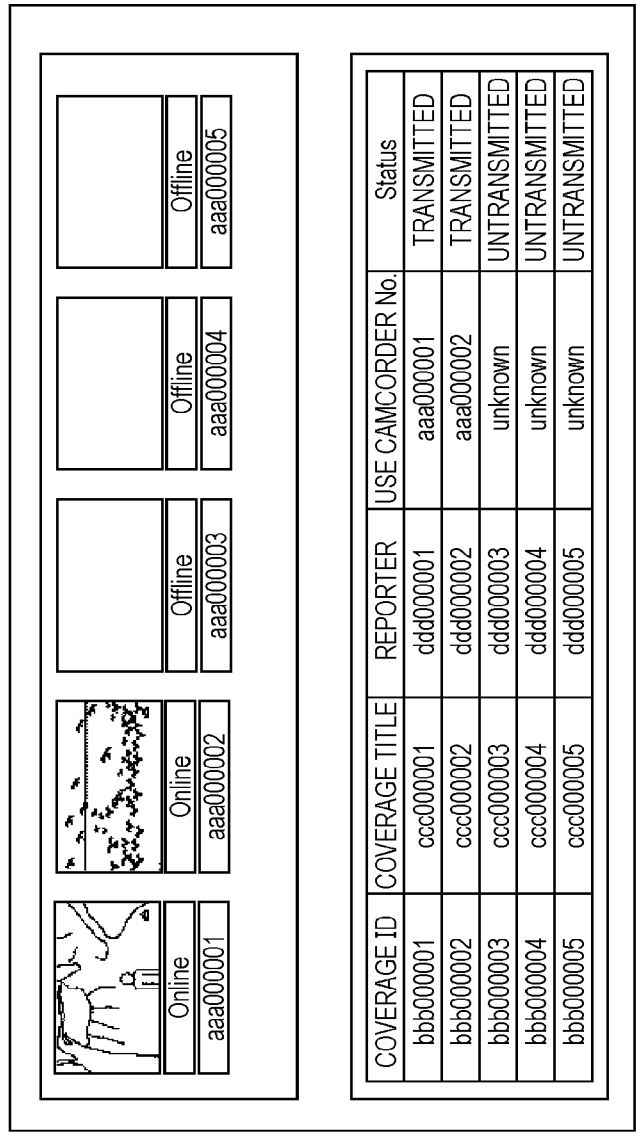
FIG. 9 is a diagram illustrating an example of a UI screen (display that some of the camcorders are in a matching state and display that coverage information to the camcorders has been transmitted).

FIG. 9 illustrates an UI display example in the aforementioned case. In this case, the example illustrates that the "use camcorder No." becomes "aaa000001" and the camcorder 301 becomes in the matching state corresponding to the coverage information with the "coverage ID" of "bbb000001", and the camcorder 301 is used for the coverage with the "coverage ID" of "bbb000001". Furthermore, the example illustrates that the "Status" becomes "transmitted" corresponding to the coverage information with the "coverage ID" of "bbb000001", and the coverage information with the "coverage ID" of "bbb000001" has been sent to the camcorder 301 with the "use camcorder No." of "aaa000001".

(8) The imaging clip data is transmitted from the camcorder 301 to the clip reception server 103. In this case, coverage information is added as clip meta information to the imaging clip data. As a result, the clip reception server 103 accepts the imaging clip data that is in the wait for acceptance state in advance on the basis of the added coverage information (clip meta information).

Figure 10:
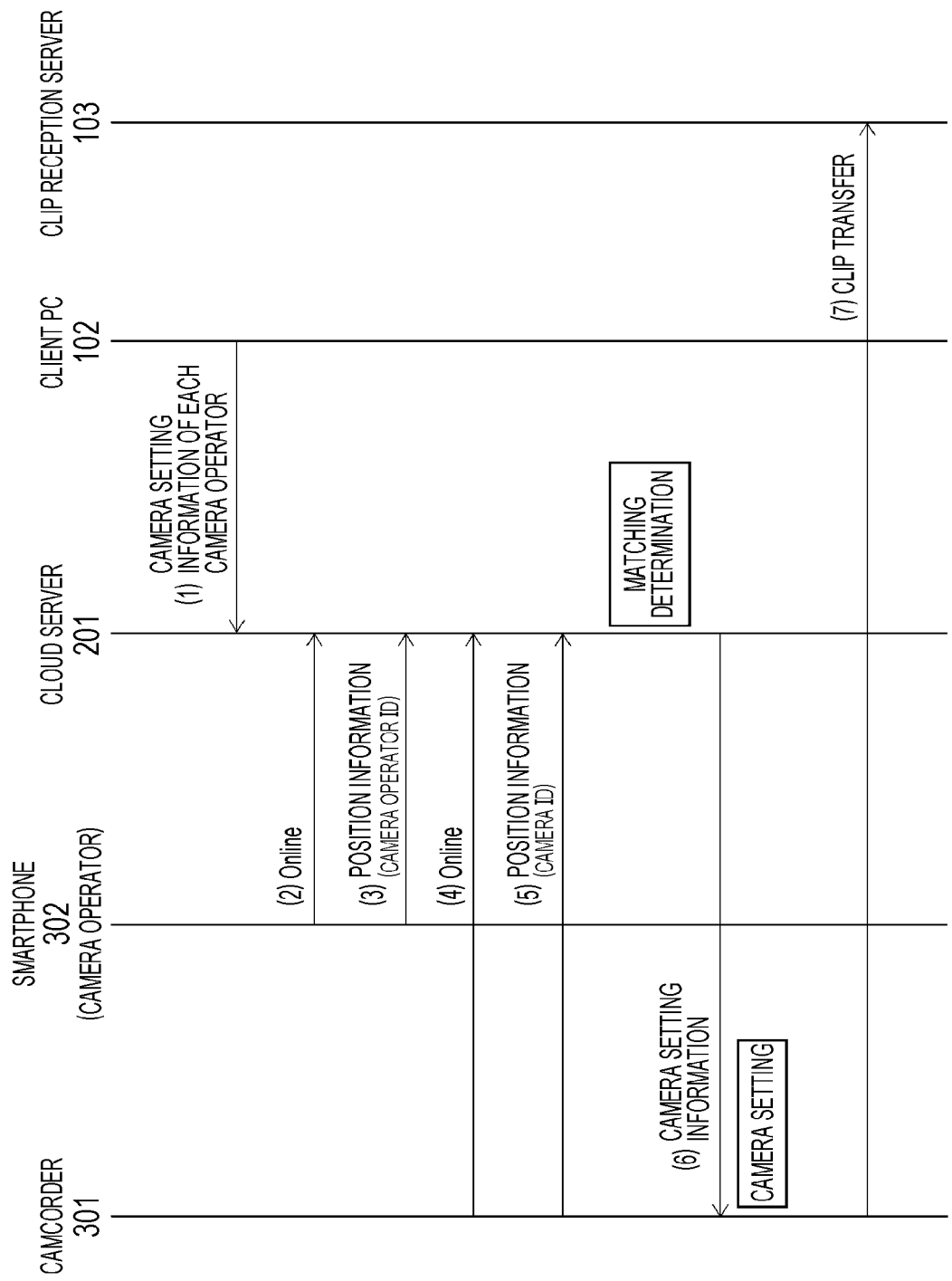
FIG. 10 is a sequence diagram illustrating an operation example in a case of automatically transmitting, from a cloud server to a camcorder, camera setting information regarding a camera operator who operates the camcorder.

Next, an operation example in a case of automatically transmitting, from the cloud server 201 to the camcorder 301, the camera setting information regarding the camera operator who operates the camcorder 301 will be described using the sequence diagram in FIG. 10.

(1) The camera setting information (see FIG. 3) for each camera operator is transmitted from the client PC 102 to the cloud server 201 and stored in the cloud server 201.

(2) The smartphone 302 becomes in the online state and is connected to the cloud server 201 via the network 200.

(3) The position information is sent from the smartphone 302 to the cloud server 201. In this case, the information of the "camera operator ID" for identifying the possessor of the smartphone 302 is added to the position information.

(4) The camcorder 301 becomes in the online state and is connected to the cloud server 201 via the network 200.

(5) The position information is sent from the camcorder 301 to the cloud server 201. In this case, a serial number (camcorder No.) of the camcorder 301 is added to the position information as a "camera ID" for identifying the camcorder 301. In the cloud server 201, matching determination is performed for each camcorder 301 from which the position information is sent.

In other words, the camcorder 301 is determined to be in the matching state with one smartphone 302 when the one smartphone 302 exists near the camcorder 301, for example, within N meters from the camcorder 301, on the basis of the sent position information and the position information received from the smartphone 302.

(6) When the camcorder 301 is determined to be in the matching state, the camera setting information related to the camera operator who possesses the one smartphone 302 is sent from the cloud server 201 to the camcorder 301. As a result, camera setting is performed on the basis of the camera setting information in the camcorder 301.

(7) The imaging clip data is transmitted from the camcorder 301 to the clip reception server 103.

As described above, in the camera system 10 illustrated in FIG. 1, the camcorder 301 transmits the position information to the cloud server 201, thereby receiving the coverage information related to the reporter who possesses the smartphone 303 located near the position indicated by the position information from the cloud server 201, and automatically holding the coverage information as the clip meta information to be added to the imaging clip data.

Furthermore, in the camera system 10 illustrated in FIG. 1, the camcorder 301 transmits the position information to the cloud server 201, thereby receiving the camera setting information related to the camera operator who possesses the smartphone 302 located near the position indicated by the position information from the cloud server 201, and automatically performing camera setting.

Furthermore, in the camera system 10 illustrated in FIG. 1, the cloud server 201 generates the display signal of the UI screen and sends the display signal to the client PC 102. Therefore, the user can easily confirm camcorder 301 that is in the online state (power on state), and further camcorder 301 that is to be used and coverage for which the camcorder 301 is used, and the like, on the UI screen displayed on the client PC 102.

2. Second Embodiment

In the above-described first embodiment, an example has been described, in which the cloud server 201 determines that the camcorder 301 is in the matching state with one smartphone 303 when the one smartphone 303 exists near the camcorder 301 on the basis of the position information from the camcorder 301 and the position information from the smartphone 303, and transmits the coverage information related to the reporter who possesses the one smartphone 303 to the camcorder 301.

However, since the coverage information for each reporter sent from the newsroom computer system 101 includes the information of "coverage location" as well (see FIG. 2), it is conceivable that the cloud server 201 uses the information of "coverage information" and selects the coverage information corresponding to the position information from the camcorder 301, and transmits the coverage information to the camcorder 301.

Figure 11:
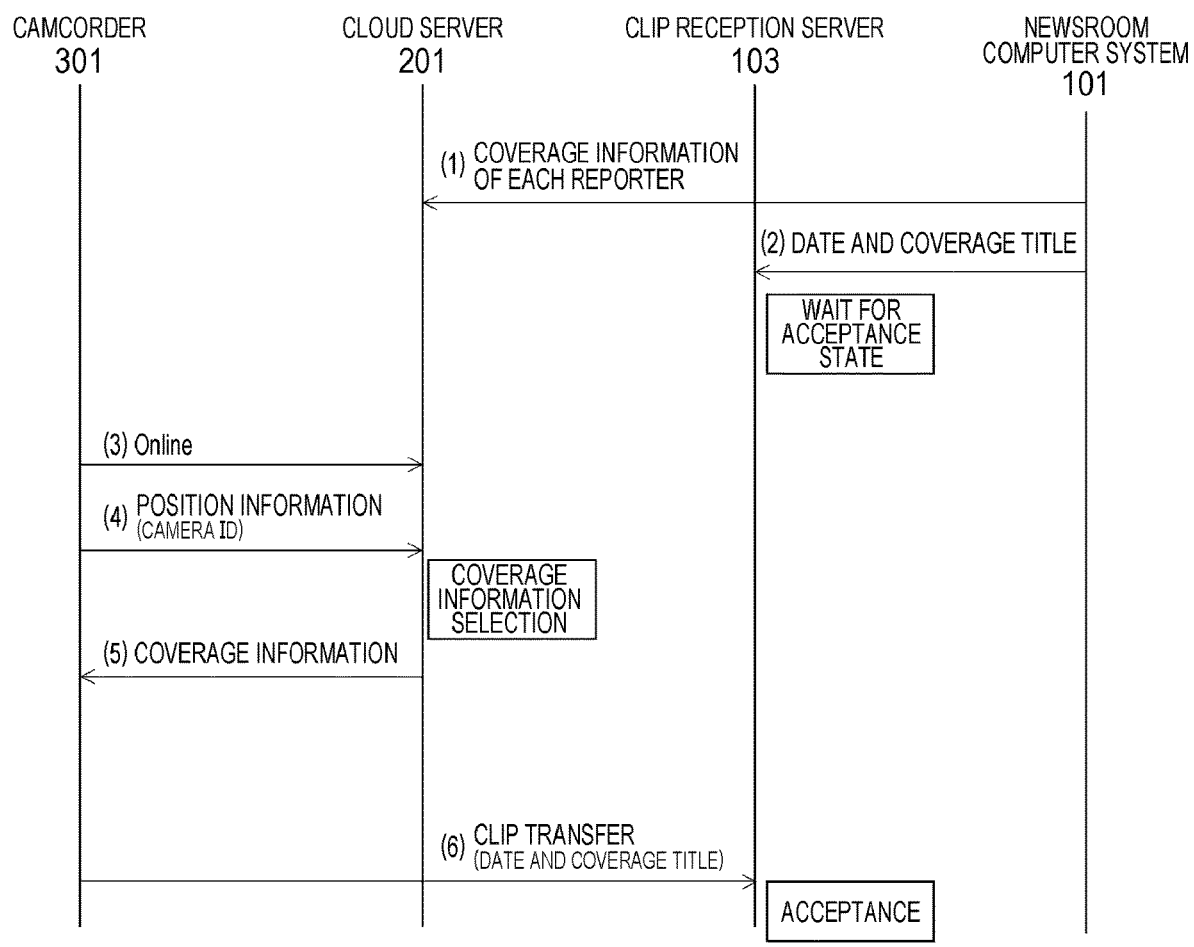
FIG. 11 is a sequence diagram illustrating an operation example in a case of automatically transmitting, from a cloud server to a camcorder, coverage information reported with the camcorder.

The sequence diagram in FIG. 11 illustrates an operation example in the aforementioned case.

(1) Coverage information (see FIG. 2) for each reporter is transmitted from a newsroom computer system 101 to a cloud server 201 and stored in the cloud server 201.

(2) Information of a date and a coverage title corresponding to the coverage information for each reporter is sent from the newsroom computer system 101 to a clip reception server 103. As a result, the clip reception server 103 becomes in a wait for acceptance state.

(3) A camcorder 301 becomes in an online state and is connected to the cloud server 201 via a network 200.

(4) Position information is sent from the camcorder 301 to the cloud server 201. In this case, a serial number (camcorder No.) of the camcorder 301 is added to the position information as a "camera ID" for identifying the camcorder 301. The cloud server 201 selects, for each camcorder 301 from which the position information is sent, coverage information having a coverage location corresponding to a position indicated by the position information.

(5) The selected coverage information is sent from the cloud server 301 to the camcorder 301. As a result, the camcorder 301 holds the coverage information as meta information for being added to imaging clip data.

(6) The imaging clip data is transmitted from the camcorder 301 to the clip reception server 103. In this case, the coverage information is added as clip meta information to the imaging clip data. As a result, the clip reception server 103 accepts the imaging clip data that is in the wait for acceptance state in advance on the basis of the added coverage information (clip meta information).

3. Application

The technology according to the present disclosure can be applied to various products. For example, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot, a construction machine, an agricultural machine (tractor), and the like.

Figure 12:
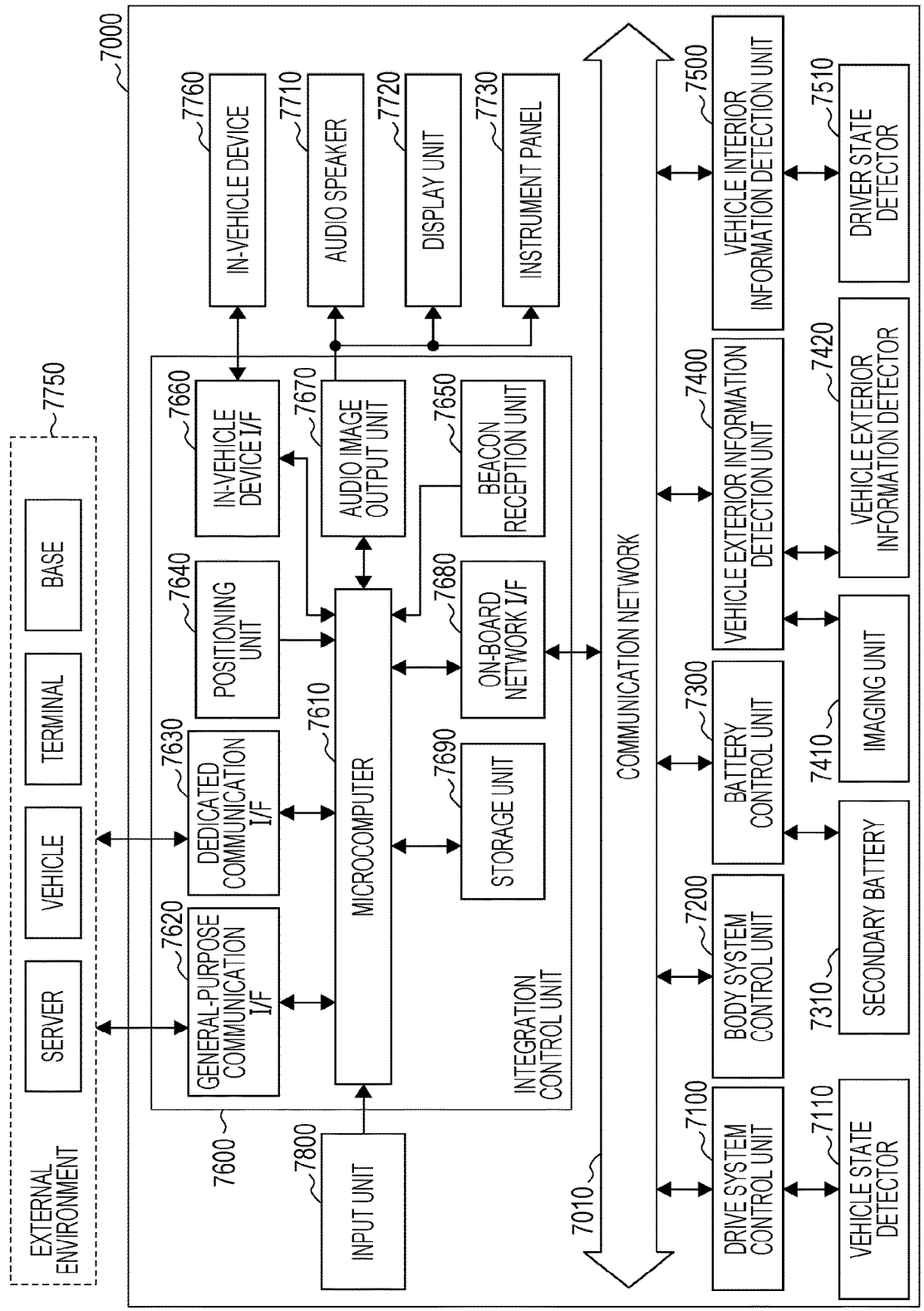
FIG. 12 is a block diagram illustrating an example of a schematic configuration of a vehicle control system.

FIG. 12 is a block diagram illustrating a schematic configuration example of a vehicle control system 7000 as an example of a moving body control system to which the technology according to the present disclosure is applicable. A vehicle control system 7000 includes a plurality of electronic control units connected through a communication network 7010. In the example illustrated in FIG. 12, the vehicle control system 7000 includes a drive system control unit 7100, a body system control unit 7200, a battery control unit 7300, a vehicle exterior information detection unit 7400, a vehicle interior information detection unit 7500, and an integration control unit 7600. The communication network 7010 that connects the plurality of control units may be, for example, an on-board communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, and the like, and a drive circuit that drives various devices to be controlled. Each control unit includes a network I/F for communicating with another control unit via the communication network 7010 and a communication I/F for communicating with a device, a sensor, or the like inside and outside the vehicle by wired communication or wireless communication. FIG. E1 illustrates, as functional configurations of the integration control unit 7600, a microcomputer 7610, a general-purpose communication I/F 7620, a dedicated communication I/F 7630, a positioning unit 7640, a beacon reception unit 7650, an in-vehicle device I/F 7660, an audio image output unit 7670, an on-board network I/F 7680, and a storage unit 7690. Similarly, the other control units include a microcomputer, a communication I/F, a storage unit, and the like.

The drive system control unit 7100 controls operations of devices regarding a drive system of a vehicle according to various programs. For example, the drive system control unit 7100 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like. The drive system control unit 7100 may have a function as a control device of an antilock brake system (ABS), electronic stability control (ESC), or the like.

The drive system control unit 7100 is connected with a vehicle state detector 7110. The vehicle state detector 7110 includes, for example, at least one of a gyro sensor for detecting angular velocity of an axial rotational motion of a vehicle body, an acceleration sensor for detecting acceleration of the vehicle, or a sensor for detecting an operation amount of an accelerator pedal, an operation amount of a brake pedal, a steering angle of a steering wheel, an engine speed, rotation speed of a wheel, or the like. The drive system control unit 7100 performs arithmetic processing using a signal input from the vehicle state detector 7110 and controls the internal combustion engine, the drive motor, an electric power steering device, a brake device, or the like.

The body system control unit 7200 controls operations of various devices equipped in the vehicle body according to various programs. For example, the body system control unit 7200 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 7200. The body system control unit 7200 receives an input of the radio waves or the signals, and controls a door lock device, the automatic window device, the lamps, and the like of the vehicle.

The battery control unit 7300 controls a secondary battery 7310 that is a power supply source of the drive motor according to various programs. For example, the battery control unit 7300 receives information such as a battery temperature, a battery output voltage, or a remaining capacity of the battery from a battery device including the secondary battery 7310. The battery control unit 7300 performs arithmetic processing using these signals to control temperature adjustment of the secondary battery 7310, a cooling device provided in the battery device, or the like.

The vehicle exterior information detection unit 7400 detects information outside the vehicle that mounts the vehicle control system 7000. For example, at least one of an imaging unit 7410 or a vehicle exterior information detector 7420 is connected to the vehicle exterior information detection unit 7400. The imaging unit 7410 includes at least one of a time of flight (ToF) camera, a stereo camera, a monocular camera, an infrared camera, or another camera. The vehicle exterior information detector 7420 includes, for example, at least one of an environmental sensor for detecting current weather or atmospheric phenomena or an ambient information detection sensor for detecting other vehicles, obstacles, pedestrians, and the like around the vehicle equipped with the vehicle control system 7000.

The environmental sensor may be, for example, at least one of a raindrop sensor for detecting rainy weather, a fog sensor for detecting fog, a sunshine sensor for detecting the degree of sunshine, or a snow sensor for detecting snowfall. The ambient information detection sensor may be at least one of an ultrasonic sensor, a radar device, or a light detection and ranging or laser imaging detection and ranging (LIDAR) device. The imaging unit 7410 and the vehicle exterior information detector 7420 may be provided as independent sensors or devices, respectively, or may be provided as devices in which a plurality of sensors or devices is integrated.

Figure 13:
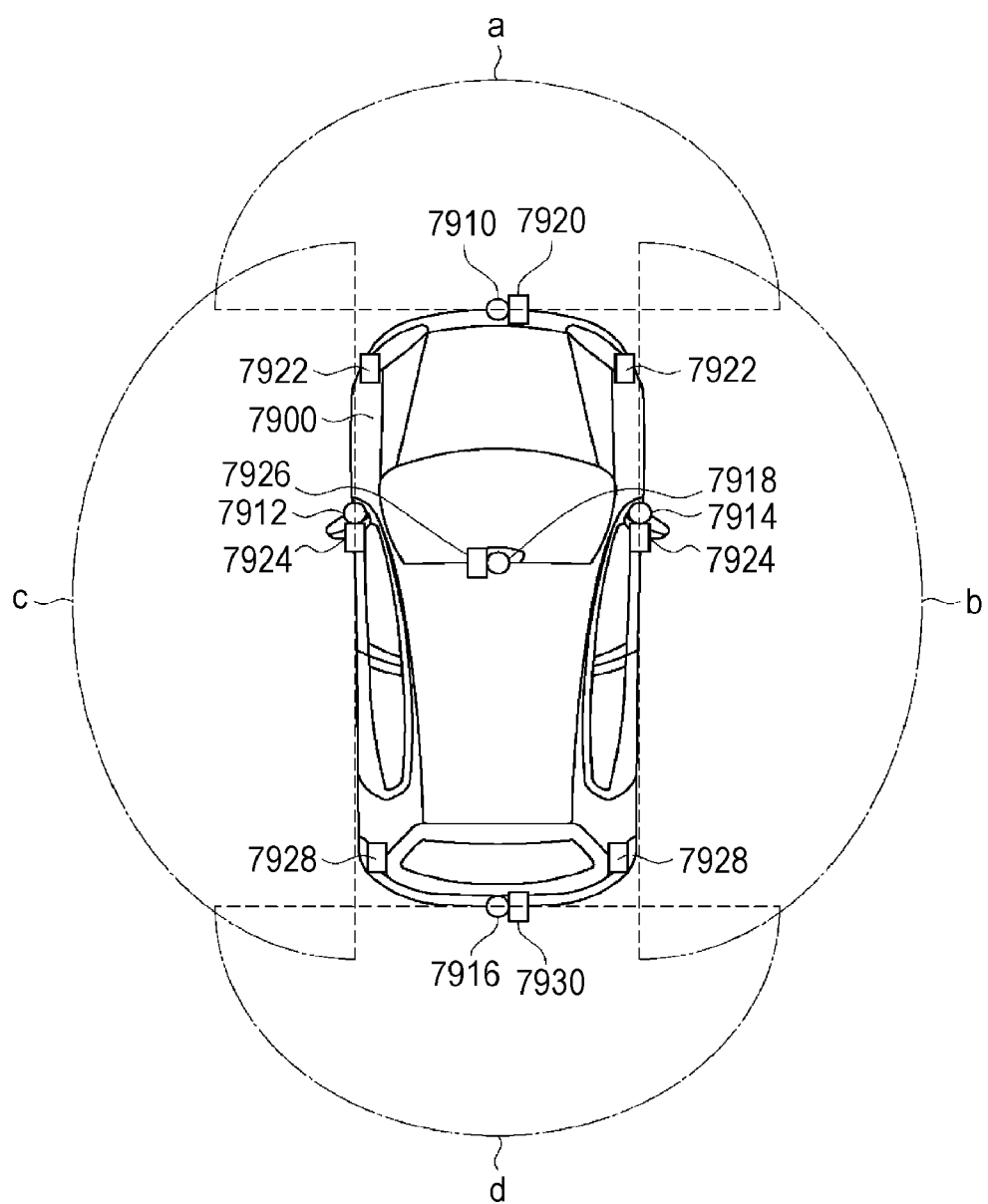
FIG. 13 is an explanatory diagram illustrating an example of installation positions of a vehicle exterior information detector and an imaging unit.

Here, FIG. 13 illustrates an example of installation positions of the imaging unit 7410 and the vehicle exterior information detector 7420. Each of imaging units 7910, 7912, 7914, 7916, and 7918 is provided on at least one position of a front nose, side mirrors, a rear bumper, a back door, or an upper portion of a windshield in an interior of a vehicle 7900, for example. The imaging unit 7910 provided at the front nose and the imaging unit 7918 provided at the upper portion of the windshield in an interior of the vehicle mainly acquire front images of the vehicle 7900. The imaging units 7912 and 7914 provided at the side mirrors mainly acquire side images of the vehicle 7900. The imaging unit 7916 provided at the rear bumper or the back door mainly acquires a rear image of the vehicle 7900. The imaging unit 7918 provided at the upper portion of the windshield in the interior of the vehicle is mainly used for detecting a preceding vehicle, a pedestrian, an obstacle, a traffic signal, a traffic sign, a lane, or the like.

Note that FIG. 13 illustrates an example of capture ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, and an imaging range d indicates an imaging range of the imaging unit 7916 provided at the rear bumper or the back door. For example, a bird's-eye view image of the vehicle 7900 as viewed from above can be obtained by superimposing image data imaged in the imaging units 7910, 7912, 7914, and 7916.

Vehicle exterior information detectors 7920, 7922, 7924, 7926, 7928, and 7930 provided at the front, rear, side, corner, and upper portion of the windshield in the interior of the vehicle 7900 may be ultrasonic sensors or radar devices, for example. Vehicle exterior information detectors 7920, 7926, and 7930 provided at the front nose, the rear bumper, the back door, and the upper portion of the windshield in the interior of the vehicle 7900 may be LIDAR devices, for example. These vehicle exterior information detectors 7920 to 7930 are mainly used for detecting a preceding vehicle, a pedestrian, an obstacle, and the like.

Referring back to FIG. 12, the description will be continued. The vehicle exterior information detection unit 7400 causes the imaging unit 7410 to image an image outside the vehicle, and receives the imaged image. Furthermore, the vehicle exterior information detection unit 7400 receives detection information from the connected vehicle exterior information detector 7420. In a case where the vehicle exterior information detector 7420 is an ultrasonic sensor, a radar device, or an LIDAR device, the vehicle exterior information detection unit 7400 transmits ultrasonic waves, electromagnetic waves, or the like and receives information of received reflected waves. The vehicle exterior information detection unit 7400 may perform object detection processing or distance detection processing of persons, vehicles, obstacles, signs, letters or the like on a road surface on the basis of the received image. The vehicle exterior information detection unit 7400 may perform environment recognition processing of recognizing rainfall, fog, a road surface condition, or the like on the basis of the received information. The vehicle exterior information detection unit 7400 may calculate the distance to the object outside the vehicle on the basis of the received information.

Furthermore, the vehicle exterior information detection unit 7400 may perform image recognition processing or distance detection processing of recognizing persons, vehicles, obstacles, signs, letters, or the like on a road surface on the basis of the received image data. The vehicle exterior information detection unit 7400 may perform processing such as distortion correction or alignment for the received image data and combine the image data imaged by different imaging units 7410 to generate a bird's-eye view image or a panoramic image. The vehicle exterior information detection unit 7400 may perform viewpoint conversion processing using the image data imaged by the different imaging units 7410.

The vehicle interior information detection unit 7500 detects information inside the vehicle. A driver state detector 7510 that detects a state of a driver is connected to the vehicle interior information detection unit 7500, for example. The driver state detector 7510 may include a camera for imaging the driver, a biometric sensor for detecting biological information of the driver, a microphone for collecting sounds in the interior of the vehicle, and the like. The biometric sensor is provided, for example, on a seating surface, a steering wheel, or the like, and detects the biological information of an occupant sitting on a seat or the driver holding the steering wheel. The vehicle interior information detection unit 7500 may calculate the degree of fatigue or the degree of concentration of the driver or may determine whether or not the driver falls asleep at the wheel on the basis of detection information input from the driver state detector 7510. The vehicle interior information detection unit 7500 may perform processing such as noise canceling processing for collected sound signals.

The integration control unit 7600 controls the overall operation in the vehicle control system 7000 according to various programs. The integration control unit 7600 is connected with an input unit 7800. The input unit 7800 is realized by, a device that can be operated and input by an occupant, such as a touch panel, a button, a microphone, a switch, or a lever, for example. Data obtained by recognizing sounds input by the microphone may be input to the integration control unit 7600. The input unit 7800 may be, for example, a remote control device using an infrared ray or another radio wave, or may be an externally connected device such as a mobile phone or a personal digital assistant (PDA) corresponding to the operation of the vehicle control system 7000. The input unit 7800 may be, for example, a camera, and in this case, the occupant can input information by gesture. Alternatively, data obtained by detecting movement of a wearable device worn by the occupant may be input. Moreover, the input unit 7800 may include, for example, an input control circuit that generates an input signal on the basis of the information input by the occupant or the like using the above input unit 7800 and outputs the input signal to the integration control unit 7600, and the like. The occupant or the like inputs various data to and instructs the vehicle control system 7000 on a processing operation by operating the input unit 7800.

The storage unit 7690 may include a read only memory (ROM) for storing various programs executed by the microcomputer, and a random access memory (RAM) for storing various parameters, calculation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may include a cellular communication protocol such as global system of mobile communications (GSM) (registered trademark), WiMAX (registered trademark), long term evolution (LTE) (registered trademark), or LTE-advanced (LTE-A), or a wireless communication protocol such as a wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 may be connected with a terminal (for example, a terminal of a driver, a pedestrian or a shop, or a machine type communication (MTC) terminal) existing in the vicinity of the vehicle, using a peer to peer (P2P) technology, for example.

The dedicated communication I/F 7630 is a communication I/F supporting a communication protocol formulated for use in the vehicle. For example, the dedicated communication I/F 7630 may include a standard protocol such as a wireless access in vehicle environment (WAVE), which is a combination of a lower layer IEEE 802.11p and an upper layer IEEE 1609, dedicated short range communications (DSRC), or a cellular communication protocol. The dedicated communication I/F 7630 typically performs V2X communication that is a concept including one or more of vehicle to vehicle communication, vehicle to infrastructure communication, vehicle to home communication, and vehicle to pedestrian communication.

The positioning unit 7640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 7640 may specify a current position by exchanging signals with a wireless access point or may acquire the position information from a terminal such as a mobile phone, a PHS, or a smartphone having a positioning function.

The beacon reception unit 7650 receives, for example, a radio wave or an electromagnetic wave transmitted from a wireless station or the like installed on a road, and acquires information such as a current position, congestion, road closure, or required time. Note that the function of the beacon reception unit 7650 may be included in the above-described dedicated communication I/F 7630.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as a wireless LAN, Bluetooth (registered trademark), near field communication (NFC), or wireless USB (WUSB). Furthermore, the in-vehicle device I/F 7660 may establish wired connection such as a universal serial bus (USB), a high-definition multimedia interface (HDMI) (registered trademark), mobile high-definition link (MHL), or the like via a connection terminal (not illustrated) (and a cable if necessary). The in-vehicle device 7760 may include, for example, at least one of a mobile device or a wearable device possessed by an occupant or an information device carried in or attached to the vehicle. Furthermore, the in-vehicle device 7760 may include a navigation device that performs a route search to an arbitrary destination. The in-vehicle device I/F 7660 exchanges control signals or data signals with these in-vehicle devices 7760.

The on-board network I/F 7680 is an interface that mediates communication between the microcomputer 7610 and the communication network 7010. The on-board network I/F 7680 transmits and receives signals and the like according to a predetermined protocol supported by the communication network 7010.

The microcomputer 7610 of the integration control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. For example, the microcomputer 7610 may calculate a control target value of the drive force generation device, the steering mechanism, or the brake device on the basis of the acquired information of the interior and the exterior of the vehicle, and output a control command to the drive system control unit 7100. For example, the microcomputer 7610 may perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle and the like. Furthermore, the microcomputer 7610 may control the drive force generation device, the steering mechanism, the braking device, or the like on the basis of the acquired information of a vicinity of the vehicle to perform cooperative control for the purpose of automatic driving of autonomous travel without depending on an operation of the driver or the like.

The microcomputer 7610 may create three-dimensional distance information between the vehicle and an object such as a peripheral structure or person and may create local map information including peripheral information of the current position of the vehicle on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. Furthermore, the microcomputer 7610 may predict danger such as a collision of the vehicle, approach of a pedestrian or the like, or entry of the pedestrian or the like into a closed road on the basis of the acquired information, and generate a warning signal. The warning signal may be, for example, a signal for generating a warning sound or for lighting a warning lamp.

The audio image output unit 7670 transmits an output signal of at least one of an audio or an image to an output device that can visually and aurally notify information to the occupant of the vehicle or outside the vehicle of information. In the example in FIG. 12, as the output device, an audio speaker 7710, a display unit 7720, and an instrument panel 7730 are exemplarily illustrated. The display unit 7720 may include, for example, at least one of an on-board display or a head-up display. The display unit 7720 may have an augmented reality (AR) display function. The output device may be a wearable device such as a headphone or a spectacular display worn by an occupant, a projector, a lamp, or the like other than the aforementioned devices. In the case where the output device is a display device, the display device visually displays a result obtained in various types of processing performed by the microcomputer 7610 or information received from another control unit, in various formats such as a text, an image, a table, and a graph. Furthermore, in the case where the output device is an audio output device, the audio output device converts an audio signal including reproduced audio data, acoustic data, or the like into an analog signal, and aurally outputs the analog signal.

Note that, in the example illustrated in FIG. 12, at least two control units connected via the communication network 7010 may be integrated as one control unit. Alternatively, an individual control unit may be configured by a plurality of control units. Moreover, the vehicle control system 7000 may include another control unit (not illustrated). Furthermore, in the above description, some or all of the functions carried out by any one of the control units may be performed by another control unit. That is, predetermined arithmetic processing may be performed by any of the control units as long as information is transmitted and received via the communication network 7010. Similarly, a sensor or a device connected to any of the control units may be connected to another control unit, and a plurality of control units may transmit and receive detection information to each other via the communication network 7010.

Note that the above-described vehicle control system 7000, for example, the integration control unit 7600 has an information processing function similar to the camcorder 301 in the above-described embodiment, in other words, a function to transmit the position information to the server via the network and receive information based on the position information from the server via the network. As described above, the vehicle control system 7000 has the information processing function similar to the camcorder 301 according to the present embodiment, so that the following application becomes possible. Note that the scope of application is not limited thereto.

(1) When a car goes to a sightseeing spot, the technology according to the present disclosure is applicable for obtaining setting information suitable for the sightseeing spot from the cloud server. For example, the setting information is information for setting the car itself (light, air conditioning, speed, and the like) in a case where the car itself is regarded as a device, and also includes information for setting a camera provided in the car.

(2) In a case where a certain user rents a car, the technology according to the present disclosure is applicable for obtaining information specific to the user from the cloud server and reflecting the obtained information on the rental car (including a camera equipped in the rental car). For example, as the information specific to the user, seat setting information according to the user, automatic driving information according to the user, recommended travel route information according to the user, audio environment information according to the user, and the like can be considered.

(3) The technology according to the present disclosure is applicable to searching for a car in a parking lot. Search for a car (or a camera provided in the car) matched with the user becomes possible, (4) The technology according to the present disclosure is applicable to security measures in car sharing. Control to unlock a car when an identical person approaches the car, control to keep a car unlocked when an identical person does not approach the car, and the like become possible.

(5) The technology according to the present disclosure is applicable to linking a driving record and personal information. Recommending taking a break or suggesting a change of mind in a case where the user is tired becomes possible using a log of the user's everyday biological information. Furthermore, the log of biological information can also be used to evaluate the way of driving.

(6) The technology according to the present disclosure is applicable to automobile insurance. In the automobile insurance, someone who is actually driving is important and identification of the person becomes possible. Furthermore, changing an insurance fee according to driving skill of the driver becomes possible Furthermore, determination as to who is the driver becomes possible using a smartphone. Furthermore, changing various setting of the car according to the driving skill of the driver, setting a shooting mode of an on-board camera, increasing a recording rate become possible. Furthermore, displaying the driving skill when the driver approaches the car becomes possible.

(7) The technology according to the present disclosure is applicable to a security viewpoint. For example, sensing can be started (a camera can be activated to start monitoring) when the driver leaves the car.

Furthermore, applications of the technology according to the present disclosure other than the above-described on-board viewpoint can be considered. For example, by applying the technology according to the present disclosure as a crime prevention viewpoint, notification to the server when the camera and the smartphone are separated becomes possible. Furthermore, for example, as medical viewpoint, the technology according to the present disclosure can be used for matching various types of equipment used in a hospital with doctor's information. Furthermore, medical information, medicine, and the like cannot be passed unless an appropriate person goes to the place, the technology according to the present disclosure can be used when determining whether or not the person is actually in the place.

4. Modification

Note that the above-described embodiment discloses the present technology in the form of exemplification, and it is obvious that a person skilled in the art can modify or substitute the embodiment without departing from the scope of the present technology. In other words, to judge the gist of present technology, the scope of claims should be taken into consideration.

Furthermore, the present technology can also have the following configurations.

(1) A camera including:
an information transmission unit configured to transmit position information to a server via a network; and
an information reception unit configured to receive information related to a specific person who possesses a portable terminal located near a position indicated by the position information from the server via the network.

(2) The camera according to (1), in which
the specific person is a reporter who reports using the camera,
the information related to the specific person is coverage information regarding the reporter, and
the camera further includes an information holding unit configured to hold the received information as meta information for being added to imaging clip data.

(3) The camera according to (1) or (2), in which
the specific person is a camera operator who operates the camera,
the information related to the specific person is camera setting information regarding the camera operator, and
the camera further includes a camera control unit configured to perform camera setting on the basis of the received information.

(4) The camera according to any one of (1) to (3), in which
the information transmission unit sends the position information to the server when power is turned on.

(5) A camera processing method including:
an information transmission unit step of transmitting, by an information transmission unit, position information to a server via a network; and
a reception step of receiving, by a reception unit, information related to a specific person who possesses a portable terminal located near a position indicated by the position information from the server via the network.

(6) A server including:
a communication unit configured to perform communication via a network with portable terminals possessed by a plurality of specific persons and a specific camera or a plurality of specific cameras;
an information holding unit configured to hold information related to each of the plurality of specific persons; and
a state determination unit configured to determine, when there is position information from one camera among the specific camera or the plurality of specific cameras, whether or not there is a matching state in which one of the portable terminals possessed by the plurality of specific persons exists near the one camera, on the basis of the position information and position information from the portable terminals possessed by the plurality of specific persons, in which
the communication unit transmits information related to a possessor of the one portable terminal located near the one camera to the one camera when it is determined that there is the matching state.

(7) The server according to (6), in which
each of the plurality of specific persons is a reporter who reports using any one of the specific camera or the plurality of specific cameras, and
the information related to each of the plurality of specific persons is coverage information regarding the reporter.

(8) The server according to (6) or (7), further including:
a display signal generation unit configured to generate a display signal of a UI screen that indicates which of the plurality of cameras is in the matching state.

(9) The server according to (8), in which
the camera in the matching state is displayed on the UI screen in association with coverage information reported with the camera.

(10) The server according to any one of (6) to (10), in which
each of the plurality of specific persons is a camera operator who operates any one of the specific camera or the plurality of specific cameras, and
the information related to each of the plurality of specific persons is camera setting information regarding the camera operator.

(11) A server processing method including:
a communication step of performing, by a communication unit, communication via a network with portable terminals possessed by a plurality of specific persons and a specific camera or a plurality of specific cameras; and
a state determination step of determining, by a state determination unit, when there is position information from one camera among the specific camera or the plurality of specific cameras, whether or not there is a matching state in which one of the portable terminals possessed by the plurality of specific persons exists near the one camera, on the basis of the position information and position information from the portable terminals possessed by the plurality of specific persons,
in the communication step, transmitting information related to a possessor of the one portable terminal located near the one camera to the one camera when it is determined that the matching state.

(12) A camera including:
an information transmission unit configured to transmit position information to a server via a network; and
an information reception unit configured to receive coverage information corresponding to the position information from the server via the network.

(13) The camera according to (12), in which the information transmission unit sends the position information to the server when power is turned on.

(14) The camera according to (12) or (13), further including:
an information holding unit configured to hold the received coverage information as meta information for being added to imaging clip data.

(15) A camera processing method including:
an information transmission step of transmitting, by an information transmission unit, position information to a server via a network; and an information reception step of receiving, by an information reception unit, coverage information corresponding to the position information from the server via the network.

(16) A server including:
a communication unit configured to perform communication via a network with a specific camera or a plurality of specific cameras; and
an information holding unit configured to hold coverage information in association with position information, in which,
when there is position information from one camera among the specific camera or the plurality of specific cameras, the communication unit transmits coverage information corresponding to the position information to the one camera.

(17) A server processing method including:
a communication step of performing, by a communication unit, communication via a network with a specific camera or a plurality of specific cameras,
in the communication step, when there is position information from one camera among the specific camera or the plurality of specific cameras, transmitting coverage information corresponding to the position information to the one camera.

REFERENCE SIGNS LIST

10 Camera system
101 Newsroom computer system
102 Client PC
103 Clip reception server
104 Content management system
105 Network interface
200 Network
201 Cloud server
211 CPU
212 ROM
213 RAM
214 Input/output interface
215 Input unit
216 Output unit
217 Storage unit
218 Drive
219 Network interface
301 Camcorder
302 Smartphone (camera operator)
303 Smartphone (reporter)
311 Control unit
311a Memory
312 User operation unit
313 Imaging unit
314 Imaging signal processing unit
315 Image compression encoder
316 Recording unit
317 Position information acquisition unit
318 Network interface

The invention claimed is:
1. A camera comprising:
a processor configured to:
transmit position information to a server via a network; and
receive information related to a specific person who possesses a portable terminal located near a position indicated by the position information from the server via the network, wherein
the information related to the specific person includes information related to coverage of content set before the coverage of the content,
the specific person includes a camera operator who operates the camera,
the information related to the specific person includes camera setting information regarding the camera operator, and
the processor is configured to perform a camera setting on a basis of the received information.
2. The camera according to claim 1, wherein
the specific person includes a reporter who reports using the camera,
the information related to the specific person includes coverage information regarding the reporter, and
the camera further comprises memory configured to store the received information as meta information for being added to imaging clip data.
3. The camera according to claim 1, wherein the processor is configured to send the position information to the server when power is turned on.
4. A camera processing method comprising:
transmitting, by a processor, position information to a server via a network; and
receiving, by the processor, information related to a specific person who possesses a portable terminal located near a position indicated by the position information from the server via the network, wherein
the information related to the specific person includes information related to coverage of content set before the coverage of the content,
the specific person is a camera operator who operates the camera,
the information related to the specific person is camera setting information regarding the camera operator, and
the method further comprises performing, by the processor, a camera setting on a basis of the received information.
5. A server comprising:
a processor configured to:
perform communication via a network with portable terminals possessed by a plurality of specific persons and a specific camera or a plurality of specific cameras;
store information related to each of the plurality of specific persons;
determine, when there is position information from one camera among the specific camera or the plurality of specific cameras, whether or not there is a matching state in which one of the portable terminals possessed by the plurality of specific persons exists near the one camera, on a basis of the position information and position information from the portable terminals possessed by the plurality of specific persons; and
transmit information related to a possessor of the one of the portable terminals located near the one camera to the one camera when it is determined that there is the matching state,
wherein the information related to the possessor includes information related to coverage of content set before the coverage of the content.
6. The server according to claim 5, wherein
each of the plurality of specific persons is a reporter who reports using any one of the specific camera or the plurality of specific cameras, and
the information related to each of the plurality of specific persons is coverage information regarding the reporter.

7. The server according to claim 5, wherein the processor is configured to generate a display signal of a UI screen that indicates which of the plurality of specific cameras is in the matching state.

8. The server according to claim 7, wherein the camera in the matching state is displayed on the UI screen in association with coverage information reported with the camera.

9. The server according to claim 5, wherein
each of the plurality of specific persons is a camera operator who operates any one of the specific camera or the plurality of specific cameras, and
the information related to each of the plurality of specific persons is camera setting information regarding the camera operator.

10. A server processing method comprising:
performing, by a processor, communication via a network with portable terminals possessed by a plurality of specific persons and a specific camera or a plurality of specific cameras; and
determining, by the processor, when there is position information from one camera among the specific camera or the plurality of specific cameras, whether or not there is a matching state in which one of the portable terminals possessed by the plurality of specific persons exists near the one camera, on a basis of the position information and position information from the portable terminals possessed by the plurality of specific persons,
transmitting, by the processor, information related to a possessor of the one of the portable terminals located near the one camera to the one camera when it is determined that there is the matching state,
wherein the information related to the possessor includes information related to coverage of content set before the coverage of the content.

11. A camera comprising:
a processor configured to:
transmit position information to a server via a network; and
receive coverage information corresponding to the position information from the server via the network, wherein
the coverage information includes information related to coverage of content set by a broadcast content producer before the coverage of the content,
the information related to the coverage of the content includes information of a camera operator who operates the camera and camera setting information regarding the camera operator, and
the processor is configured to perform a camera setting on a basis of the received coverage information.

12. The camera according to claim 11, wherein the processor is configured to send the position information to the server when power is turned on.

13. The camera according to claim 11, wherein the processor is configured to store the received coverage information as meta information for being added to imaging clip data.

14. A camera processing method comprising:
transmitting, by a processor, position information to a server via a network; and
receiving, by the processor, coverage information corresponding to the position information from the server via the network, wherein
the coverage information includes information related to coverage of content set by a broadcast content producer before the coverage of the content,
the information related to the coverage of the content includes information of a camera operator who operates the camera and camera setting information regarding the camera operator, and
the method further comprises performing, by the processor, a camera setting on a basis of the received coverage information.

15. A server comprising:
a processor configured to:
perform communication via a network with a specific camera or a plurality of specific cameras;
store coverage information in association with position information; and
when there is position information from one camera among the specific camera or the plurality of specific cameras, transmit coverage information corresponding to the position information to the one camera, wherein
the coverage information includes information related to coverage of content set by a broadcast content producer before the coverage of the content,
the information related to the coverage of the content includes information of a camera operator who operates the one camera and camera setting information regarding the camera operator, and
a camera setting of the one camera is performable based on the coverage information.

16. A server processing method comprising:
performing, by a processor, communication via a network with a specific camera or a plurality of specific cameras, and
when there is position information from one camera among the specific camera or the plurality of specific cameras, transmitting, by the processor, coverage information corresponding to the position information to the one camera, wherein
the coverage information includes information related to coverage of content set by a broadcast content producer before the coverage of the content,
the information related to the coverage of the content includes information of a camera operator who operates the one camera and camera setting information regarding the camera operator, and
a camera setting of the one camera is performable based on the coverage information.

17. An information processing apparatus comprising:
a processor configured to:
transmit position information to a server via a network; and
receive information related to a specific person who possesses a portable terminal located near a position indicated by the position information from the server via the network, wherein
the information related to the specific person includes information related to coverage of content set before the coverage of the content,
the specific person includes an information processing apparatus operator who operates the information processing apparatus,
the information related to the specific person includes information processing apparatus setting information regarding the information processing apparatus operator, and
the processor is configured to perform an information processing apparatus setting on a basis of the received information.

18. An information processing apparatus comprising:
a processor configured to:
transmit position information to a server via a network; and
receive information corresponding to the position information from the server via the network, wherein
the information includes information related to coverage of content set by a content producer before the coverage of the content,
the information related to the coverage of the content includes information of an information processing apparatus operator who operates the information processing apparatus and information processing apparatus setting information regarding the operator, and
the processor is configured to perform an information processing apparatus setting on a basis of the received information.

* * * * *